United States Patent
Ahn et al.

(10) Patent No.: US 11,236,251 B2
(45) Date of Patent: Feb. 1, 2022

(54) RESIN COMPOSITION FOR COATING, AND COATING FILM COMPRISING CURED PRODUCT THEREOF AS COATING LAYER

(71) Applicant: KOLON INDUSTRIES, INC., Seoul (KR)

(72) Inventors: Sang Hyun Ahn, Seoul (KR); Dong Hee Lee, Seoul (KR); Pil Rye Yang, Seoul (KR); Seong Hoon Baek, Seoul (KR); Hang Geun Kim, Seoul (KR); Byung Joon An, Seoul (KR)

( * ) Notice: Subject to any disclaimer, the term of this patent is extended or adjusted under 35 U.S.C. 154(b) by 58 days.

(21) Appl. No.: 16/612,837

(22) PCT Filed: May 31, 2018

(86) PCT No.: PCT/KR2018/006220
§ 371 (c)(1),
(2) Date: Nov. 12, 2019

(87) PCT Pub. No.: WO2018/221980
PCT Pub. Date: Dec. 6, 2018

(65) Prior Publication Data
US 2020/0199405 A1   Jun. 25, 2020

(30) Foreign Application Priority Data

May 31, 2017 (KR) .................. 10-2017-0067763
May 30, 2018 (KR) .................. 10-2018-0061628

(51) Int. Cl.
| C09D 183/14 | (2006.01) |
| C08G 77/48 | (2006.01) |
| C09D 183/16 | (2006.01) |
| C08G 77/60 | (2006.01) |
| C08G 77/14 | (2006.01) |
| C08G 77/50 | (2006.01) |

(52) U.S. Cl.
CPC ........... *C09D 183/16* (2013.01); *C08G 77/14* (2013.01); *C08G 77/48* (2013.01); *C08G 77/50* (2013.01); *C08G 77/60* (2013.01); *C09D 183/14* (2013.01); *C08J 2483/14* (2013.01); *C08L 2312/06* (2013.01)

(58) Field of Classification Search
USPC .......................... 106/287.13, 287.16; 528/29
See application file for complete search history.

(56) References Cited

U.S. PATENT DOCUMENTS

| 5,973,044 A | 10/1999 | Kubo et al. | |
| 6,248,854 B1* | 6/2001 | Hohn | C08G 59/306 |
| | | | 525/476 |
| 2007/0179268 A1 | 8/2007 | Lejeune et al. | |
| 2011/0244244 A1* | 10/2011 | Nakatsukasa | C09D 183/06 |
| | | | 428/413 |
| 2015/0275043 A1* | 10/2015 | Kikuchi | C09D 183/04 |
| | | | 428/220 |
| 2016/0024348 A1 | 1/2016 | Kim et al. | |
| 2016/0137673 A1 | 5/2016 | Sadohara et al. | |

FOREIGN PATENT DOCUMENTS

| CN | 101410438 A | 4/2009 |
| CN | 102143986 A | 8/2011 |
| CN | 104755568 A | 7/2015 |
| CN | 105295718 A | 2/2016 |
| EP | 0523242 A1 | 1/1993 |
| EP | 0982349 A2 | 1/2000 |
| EP | 3674374 A1 | 1/2020 |
| EP | 3683047 A1 | 7/2020 |
| JP | 2009524727 A | 7/2009 |
| KR | 10-2008-0086528 A | 9/2008 |
| KR | 10-2011-0104947 A | 9/2011 |
| KR | 10-2016-0013402 A | 2/2016 |
| KR | 10-2017-0040125 A | 4/2017 |
| WO | WO 2014/098423 A1 * | 2/2014 |
| WO | 2014/207886 A1 | 12/2014 |
| WO | 2016/017792 A1 | 2/2016 |
| WO | 2016108676 A1 | 7/2016 |

OTHER PUBLICATIONS

Machine translation of WO 2014/098423 into English (no date).*
Search Report issued by EPO dated Feb. 5, 2021.
International Search Report of PCT/KR2018/006220 dated Sep. 21, 2018.
Office action issued by Chiness Patent Office dated Jan. 27, 2021.
Office action issued by Japan Patent Office.

* cited by examiner

*Primary Examiner* — Marc S Zimmer
(74) *Attorney, Agent, or Firm* — Harvest IP Law, LLP

(57) ABSTRACT

The present invention relates to a resin composition for coating, and a coating film comprising a cured product thereof as a coating layer. Particularly, the present invention relates to a resin composition for coating, and a coating film comprising a cured product thereof as a coating layer, wherein the resin composition for coating comprises a siloxane resin that is chemically bonded by compounds comprising alkoxysilane and diol, which comprise epoxy or acryl within the chemical structures thereof.

3 Claims, No Drawings

RESIN COMPOSITION FOR COATING, AND COATING FILM COMPRISING CURED PRODUCT THEREOF AS COATING LAYER

CROSS REFERENCE TO RELATED APPLICATIONS

This application is a National Stage of International Application No. PCT/KR2018/006220 filed May 31, 2018, claiming priority based on Korean Patent Application No. 10-2017-0067763 filed May 31, 2017 and Korean Patent Application No. 10-2018-0061628 filed May 30, 2018.

TECHNICAL FIELD

The present disclosure relates to a resin composition for coating and a coating film including a cured product thereof as a coating layer.

BACKGROUND ART

Transparent polymer films are widely used as core materials in the field of optical, transparent and flexible displays, and in particular have come to replace glass in the display industry due to the light weight, ease of processing and flexibility thereof. However, since transparent polymer films have disadvantages of low surface hardness and abrasion resistance compared to glass, coating techniques for improving the abrasion resistance of polymer films arise as an important issue.

The materials used for polymer films broadly include organic materials, inorganic materials and hybrid organic-inorganic materials. Thereamong, organic materials have advantages of flexibility and moldability due to the inherent characteristics of organic substances, but have the disadvantage of low surface hardness, whereas inorganic materials have the advantages of high surface hardness and transparency, but have the disadvantages of poor flexibility and moldability. For this reason, hybrid organic-inorganic materials having the advantages of both materials are receiving attention at present, and active research thereon is underway. However, it is not possible at present to realize the advantages of both types of materials.

In addition, the most important requirements in order for surface-coated polymer films to be appropriate for use in optical applications are that coating agents should have excellent adhesivity to the films and should be free from curling and rainbow phenomena. Therefore, finding coating materials that are capable of exhibiting all of these advantages has arisen as a key issue for technology development.

There are several patent documents that disclose coating compositions relating to polymer films. For example, Korean Patent Laid-open No. 2010-0041992 discloses a high-hardness hard coating film composition including an ultraviolet ray-curable polyurethane acrylate oligomer, and Korean Patent Laid-open No. 2011-0013891 discloses a vinyl oligosiloxane hybrid composition including a metal catalyst. The former case can minimize the curling phenomenon and prevent the rainbow phenomenon, which is attributable to optical interference. The latter case reported a low shrinkage rate and excellent optical properties and heat resistance of a composition having an inorganic network structure.

Meanwhile, International Patent Publication No. WO 2014-129768 discloses a high-hardness siloxane resin composition containing a cyclic epoxy group, a method for preparing the same, and an optical film including a cured product thereof. This patent suggests that the technical level of the hard coating has improved such that a high hardness of 9H is able to be implemented.

Nevertheless, coating materials still have limitations in that drawbacks in terms of hardness and permeability are inevitable when putting emphasis on the advantages of organic materials, and the drawback associated with flexibility cannot be completely overcome when putting emphasis on the advantages of inorganic materials. In particular, organic materials are suitable for surface coating of polymer films due to the advantage of flexibility thereof. However, when the surface hardness of the coating layer is improved by forming a dense network between the molecules, increased shrinkage may result in curling and cracking, which causes the coating layer to peel off due to the deteriorated adhesivity. Therefore, for wider use of polymer films, there is urgent need for techniques capable of preventing deterioration in the flexibility of films due to the coating while increasing the surface hardness thereof.

DISCLOSURE

Technical Problem

Therefore, the present disclosure has been made in view of the above problems, and it is one object of the present disclosure to provide a resin composition for coating which has a surface hardness of at least 3H as well as excellent flexibility and abrasion resistance. It is another object of the present disclosure to provide a coating film including a cured product of the resin composition as a coating layer.

Technical Solution

In accordance with a first aspect of the present disclosure to solve the technical problems, provided is a resin composition for coating including a siloxane resin chemically bonded by a silane compound represented by the following Formula 1 and a diol compound represented by the following Formula 2:

$$R^1{}_n Si(OR^2)_{4-n} \qquad <\text{Formula 1}>$$

wherein $R^1$ is a C1-C3 linear, branched or cyclic alkylene group substituted with epoxy or acryl, $R^2$ is a C1-C8 linear, branched or cyclic alkyl group, and n is an integer of 1 to 3,

$$HO(CH_2)_n OH \qquad <\text{Formula 2}>$$

wherein n is an integer of 1 to 10.

The diol compound represented by Formula 2 may be contained in a molar ratio of 1:0.1 to 1:1.5 relative to the silane compound represented by Formula 1.

The silane compound represented by Formula 1 may include at least one selected from 3-glycidoxypropyl trimethoxysilane, 3-glycidoxypropyl triethoxysilane, 3-glycidoxypropyl tripropoxysilane, 3-methacryloxypropyl trimethoxysilane, 3-methacryloxypropyl triethoxysilane, 3-acryloxypropyl trimethoxysilane, 3-acryloxypropyl triethoxysilane, 3-acryloxypropyl tripropoxysilane, 2-(3,4-epoxycyclohexyl)ethyltrimethoxysilane, 2-(3,4-epoxycyclohexyl)ethyltriethoxysilane and 2-(3,4-epoxycyclohexyl)ethyltripropoxysilane.

The siloxane resin may further include a silane compound represented by the following Formula 3, which is chemically bonded together with the silane compound represented by Formula 1 and the diol compound represented by Formula 2.

$$Si(OR^4)_4 \qquad <\text{Formula 3}>$$

wherein $R^4$ is a C1-C4 linear or branched alkyl group.

The silane compound represented by Formula 3 may be contained in a molar ratio of 1:0.01 or more relative to the silane compound represented by Formula 1.

The siloxane resin may have a weight average molecular weight of 1,000 to 10,000 and a molecular weight distribution of 1.2 to 3.4.

The resin composition for coating may further include at least one additive selected from the group consisting of an organic solvent, a photoinitiator, a thermal initiator, an antioxidant, a leveling agent and a coating aid.

In accordance with a second aspect of the present disclosure, there is provided a coating film including a base film and a coating layer laminated on at least one surface of the base film and including a cured product of the resin composition for coating according to the first aspect as a coating layer.

The coating film may have a surface hardness in the direction in which the coating layer is formed, measured in accordance with ASTM D3363, of 3H or more.

The coating film may have a distance (curl), from an edge of the film to the bottom, of 5 mm or less, based on a coating thickness of 10 μm.

The coating film may have a radius of curvature, measured using a radial mode of a bending tester (JIRBT -620-2), of 2.0 mm or less, based on a coating thickness of 10 μm.

Advantageous Effects

The present disclosure can maximize flexibility during curing through incorporation of a linear diol structure in a polymer-bonding structure, while securing surface hardness and scratch resistance through dense crosslinking of the siloxane network derived from siloxane molecules.

BEST MODE

In one aspect, the present disclosure is directed to a resin composition for coating including a siloxane resin chemically bonded by a silane compound represented by the following Formula 1 and a diol compound represented by the following Formula 2:

$R^1_n Si(OR^2)_{4-n}$           <Formula 1> wherein $R^1$ is a C1-C3 linear, branched or cyclic alkylene group substituted with epoxy or acryl, $R^2$ is a C1-C8 linear, branched or cyclic alkyl group, and n is an integer of 1 to 3,

$HO(CH_2)_n OH$           <Formula 2> wherein n is an integer of 1 to 10.

The silane compound represented by Formula 1 may include at least one selected from 3-glycidoxypropyl trimethoxysilane, 3-glycidoxypropyl triethoxysilane, 3-glycidoxypropyl tripropoxysilane, 3-methacryloxypropyl trimethoxysilane, 3-methacryloxypropyl triethoxysilane, 3-acryloxypropyl trimethoxysilane, 3-acryloxypropyl triethoxysilane, 3-acryloxypropyl tripropoxysilane, 2-(3,4-epoxycyclohexyl)ethyltrimethoxysilane, 2-(3,4-epoxycyclohexyl)ethyltriethoxysilane and 2-(3,4-epoxycyclohexyl) ethyltripropoxysilane, but is not limited thereto.

However, when the siloxane resin is synthesized using the silane compound alone, high surface hardness can be secured, but there is a limitation on securing flexibility, since the bonding structure is formed only through dense siloxane crosslinking. Accordingly, by polymerizing a siloxane resin using a silane compound containing an alkoxy silane represented by Formula 1 along with a diol compound represented by Formula 2, the present disclosure is capable of incorporating the linear diol structure in the polymer chain of the siloxane resin and thereby imparting excellent flexibility to the cured product of the resin composition for coating including the siloxane resin.

More specifically, the diol compound represented by Formula 2 according to the present disclosure preferably has a linear structure. The reason for this is that, when the linear diol compound has a linear structure, flexibility can be maximized due to free rotation in the molecule.

In the diol compound represented by Formula 2, n is an integer of 1 to 10, preferably an integer of 2 to 6. When n is within the range defined above, the decrease in hardness can be minimized.

The diol compound represented by Formula 2 has a molar ratio of 1:0.1 to 1:1.5, preferably 1:0.1 to 1:1.5, and more preferably 1:0.1 to 1:0.5, relative to the silane compound represented by Formula 1.

When the molar ratio of the diol compound represented by Formula 2 is less than 0.1, there is a limitation in realizing bendability because the increase in flexibility is insufficient, and when the molar ratio exceeds 1.5, the decrease in viscosity resulting from the diol residue makes it difficult to determine the reaction time, which causes problems in the process of preparing the siloxane resin.

The siloxane resin may further include a silane compound represented by the following Formula 3, which is chemically bonded together with the silane compound represented by Formula 1 and the diol compound represented by Formula 2.

$Si(OR^4)_4$           <Formula 3> wherein $R^4$ is a C1-C4 linear or branched alkyl group.

The silane compound represented by Formula 3 forms a silane Q structure having no alkoxy functional group in Si in the polymer chain of the siloxane resin, so that the resin composition for coating can be cured to thus provide hardness comparable to that of glass.

The silane compound represented by Formula 3 is preferably contained in a molar ratio of 1:0.01 or more relative to the silane compound represented by Formula 1.

When the molar ratio of the silane compound represented by Formula 3 is less than 0.01, a silane Q structure having no alkoxy functional group in Si cannot be sufficiently formed in the polymer chain of the siloxane resin, and hardness and scratch resistance may thus be lowered.

In this regard, when the molar ratio of the silane compound represented by Formula 3 is 0.01 or more, a polymerization product having a satisfactory Q structure can be produced and thus the desired hardness and scratch resistance of the present disclosure can be secured, and when the silane compound represented by Formula 3 is present in an excessive amount of higher than 0.01 or more, the desired effects are not improved any further, and thus the increased content is meaningless in terms of improvement of hardness and scratch resistance.

In the present disclosure, the synthesis of the siloxane resin may be carried out through an alkoxy-diol substitution reaction or through condensation-polymerization. The reaction may be carried out at room temperature, but may alternatively be carried out while performing stirring at 50 to 120° C. for 1 to 120 hours. The catalyst for conducting the substitution reaction of alkoxy with diol (hydrolysis with water) and condensation polymerization may be an acid catalyst such as hydrochloric acid, acetic acid, hydrogen fluoride, nitric acid, sulfuric acid or iodic acid, a base catalyst such as ammonia, potassium hydroxide, sodium hydroxide, barium hydroxide or imidazole, and an ion exchange resin such as Amberite. These catalysts may be used alone or in combination thereof. The amount of the catalyst may be about 0.0001 parts to about 10 parts by weight, based on 100 parts by weight of the siloxane resin, but is not particularly limited thereto.

When the substitution reaction and the condensation polymerization are conducted, water or alcohol is produced as a byproduct. When removing this water or alcohol, the reverse reaction can be suppressed and the forward reaction can be performed more quickly, so that control of the reaction rate is possible through this principle. After completion of the reaction, the byproduct may be removed by heating under reduced pressure.

The siloxane resin of the present disclosure thus synthesized may have a weight average molecular weight of 1,000 to 10,000 and a polydispersion index (PDI) of 1.2 to 3.4. The molecular weight (Mw) and polydispersion index (PDI) correspond to the weight average molecular weight (Mw) and the number average molecular weight (Mn) determined for polystyrene through gel permeation chromatography (GPC, Waters Alliance, Model: e2695). The polymer to be measured was dissolved at a concentration of 1% in tetrahydrofuran and was injected in an amount of 20 µl into GPC. The mobile phase of GPC was tetrahydrofuran and was fed at a flow rate of 1.0 mL/min, and analysis was conducted at 30° C. The column used herein was purchased from Waters Styragel HR3, and two columns were connected in series. The detector herein used was an RI detector (Waters Alliance, 2414) and measurement was conducted at 40° C. At this time, the molecular weight distribution (PDI) was calculated by dividing the measured weight average molecular weight by the number average molecular weight.

Meanwhile, in addition to the siloxane resin, the resin composition for coating may further include, as another component, at least one additive selected from the group consisting of an organic solvent, a photoinitiator, a thermal initiator, an antioxidant, a leveling agent and a coating aid. In this case, it is possible to provide a resin composition for coating suitable for various applications by controlling the kind and content of the additive that is used. In the present disclosure, a resin composition for coating capable of improving hardness, abrasion resistance, flexibility and curling resistance is preferably provided.

The initiator according to the present disclosure is, for example, a photopolymerization initiator such as an organometallic salt and a photopolymerization initiator such as amine and imidazole. In this case, the amount of the initiator that is added is preferably about 0.5 to 5 parts by weight based on 100 parts by weight of the total amount of the siloxane resin. When the content of the initiator is less than 0.5 parts by weight, the curing time of the coating layer required to obtain sufficient hardness is lengthened and efficiency is thus deteriorated. When the content of the initiator is more than 5 parts by weight, the yellowness of the coating layer may be increased, thus making it difficult to obtain a transparent coating layer.

Also, the organic solvent may include at least one selected from the group consisting of ketones such as acetone, methyl ethyl ketone, methyl butyl ketone and cyclohexanone, cellosolves such as methyl cellosolve and butyl cellosolve, ethers such as ethyl ether and dioxane, alcohols such as isobutyl alcohol, isopropyl alcohol, butanol and methanol, halogenated hydrocarbons such as dichloromethane, chloroform and trichlorethylene, and hydrocarbons such as normal hexane, benzene and toluene. In particular, since the viscosity of the siloxane resin can be controlled by controlling the amount of the organic solvent that is added, workability can be further improved, or the thickness of the coating film can be controlled.

Further, the present disclosure may provide a cured product with high hardness obtained by forming the resin composition for coating using a method such as coating, casting or molding, followed by photopolymerization or thermal polymerization. In particular, the present disclosure is directed to a coating film including a base film and a coating layer laminated on at least one surface of the base film and including a cured product of the resin composition for coating as a coating layer. The coating film may have a surface hardness in the direction in which the coating layer is formed, measured in accordance with ASTM D3363, of at least 3H. The coating film may have a distance (curl) from an edge of the film to the bottom, of 5 mm or less, based on a coating thickness of 10 µm. The coating film may have a radius of curvature, measured using a radial mode of a bending tester (JIRBT-620-2), of 2.0 mm or less, based on a coating thickness of 10 µm. This means that the resin composition has hardness as well as considerably excellent curl characteristics and flexibility.

In the present disclosure, when the resin composition for coating is polymerized, the amount of light suitable for photopolymerization may be not less than 50 mJ/cm$^2$ and not more than 20,000 mJ/cm$^2$, and heat treatment may be performed at a temperature not lower than 40° C. and not higher than about 300° C. so as to obtain a uniform surface before the photopolymerization. In addition, a temperature suitable for thermal polymerization is not lower than 40° C. and not higher than 300° C., but is not limited thereto.

MODE FOR INVENTION

Hereinafter, the present disclosure will be described in more detail with reference to the following Examples. The examples are only provided only for better understanding of the present disclosure and should not be construed as limiting the scope of the present disclosure.

Example 1

KBM-403 (Shin-Etsu Chemical Co., Ltd.; 3-glycidoxypropyl trimethoxysilane) and ethylene glycol (Sigma-Aldrich Corporation) were mixed at a ratio of 472.6 g:186.2 g (200 mmol:300 mmol), the resulting mixture was injected into a 1,000 mL double-jacket reactor, and 0.1 g of sodium hydroxide was dissolved in 1 mL of distilled water in a 10 mL vial using a magnetic stirrer. Then, an aqueous sodium hydroxide solution was added as a catalyst, and the mixture was stirred at 200 RPM with a mechanical stirrer at 90° C. for 10 hours using a thermostat. Then, the resulting mixture was diluted with 2-butanone to a solid content of 50 wt % and then filtered through a 0.45 µm Teflon filter to obtain a siloxane resin. The molecular weight of the resin was measured using GPC, and the result showed that the resin had a number average molecular weight of 937, a weight average molecular weight of 1,154, and a polydispersity index (PDI, Mw/Mn) of 1.23.

Next, 3 parts by weight of IRGACURE 250 (BASF Corporation), which is a photoinitiator, with respect to 100 parts by weight of the siloxane resin, was added to the siloxane resin diluted in the solvent to finally obtain a resin composition for coating.

This composition was coated on the polyimide surface using a bar, dried at 80° C. for 20 minutes and then exposed to an ultraviolet lamp having a wavelength of 315 nm for 30 seconds to prepare a 10 μm coating film.

Example 2

KBM-403 (Shin-Etsu Chemical Co., Ltd.), ethylene glycol (Sigma-Aldrich Corporation) and distilled water were mixed at a ratio of 472.6 g:168 g:5.4 g (200 mmol:270 mmol:30 mmol), the resulting mixture was injected into a 1,000 mL double-jacket reactor, and 0.1 g of sodium hydroxide was dissolved in 1 mL of distilled water in a 10 mL vial using a magnetic stirrer. Then, an aqueous sodium hydroxide solution was added as a catalyst, and the mixture was stirred at 200 RPM with a mechanical stirrer at 90° C. for 10 hours using a thermostat. Then, the resulting mixture was diluted with 2-butanone to a solid content of 50 wt % and then filtered through a 0.45 μm Teflon filter to obtain a siloxane resin. The molecular weight of the resin was measured using GPC, and the result showed that the resin had a number average molecular weight of 1,052, a weight average molecular weight of 1,653 and a polydispersity index (PDI, Mw/Mn) of 1.57. Then, a resin composition for coating was prepared in the same manner as in Example 1, and was coated on a polyimide film to prepare a 10 μm coating film.

Example 3

KBM-403 (Shin-Etsu Chemical Co., Ltd.), ethylene glycol (Sigma-Aldrich Corporation) and distilled water were mixed at a ratio of 472.6 g:130 g:16 g (200 mmol:210 mmol:90 mmol), the resulting mixture was injected into a 1,000 mL double-jacket reactor, and 0.1 g of sodium hydroxide was dissolved in 1 mL of distilled water in a 10 mL vial using a magnetic stirrer. Then, an aqueous sodium hydroxide solution was added as a catalyst, and the mixture was stirred at 200 RPM with a mechanical stirrer at 90° C. for 10 hours using a thermostat. Then, the resulting mixture was diluted with 2-butanone to a solid content of 50 wt % and then filtered through a 0.45 μm Teflon filter to obtain a siloxane resin. The molecular weight of the resin was measured using GPC, and the result showed that the resin had a number average molecular weight of 2,022, a weight average molecular weight of 3,164 and a polydispersity index (PDI, Mw/Mn) of 1.56. Then, a resin composition for coating was prepared in the same manner as in Example 1, and was coated on a polyimide film to prepare a 10 μm coating film.

Example 4

KBM-403 (Shin-Etsu Chemical Co., Ltd.), ethylene glycol (Sigma-Aldrich Corporation) and distilled water were mixed at a ratio of 472.6 g:93 g:27 g (200 mmol:150 mmol:150 mmol), the resulting mixture was injected into a 1,000 mL double-jacket reactor, and 0.1 g of sodium hydroxide was dissolved in 1 mL of distilled water in a 10 mL vial using a magnetic stirrer. Then, an aqueous sodium hydroxide solution was added as a catalyst, and the mixture was stirred at 200 RPM with a mechanical stirrer at 90° C. for 10 hours using a thermostat. Then, the resulting mixture was diluted with 2-butanone to a solid content of 50 wt % and then filtered through a 0.45 μm Teflon filter to obtain a siloxane resin. The molecular weight of the resin was measured using GPC, and the result showed that the resin had a number average molecular weight of 1,804, a weight average molecular weight of 2,356, and a polydispersity index (PDI, Mw/Mn) of 1.31. Then, a resin composition for coating was prepared in the same manner as in Example 1, and was coated on a polyimide film to prepare a 10 μm coating film.

Example 5

KBM-403 (Shin-Etsu Chemical Co., Ltd.), ethylene glycol (Sigma-Aldrich Corporation) and distilled water were mixed at a ratio of 472.6 g:56 g:38 g (200 mmol:90 mmol:210 mmol), the resulting mixture was injected into a 1,000 mL double-jacket reactor, and 0.1 g of sodium hydroxide was dissolved in 1 mL of distilled water in a 10 mL vial using a magnetic stirrer. Then, an aqueous sodium hydroxide solution was added as a catalyst, and the mixture was stirred at 200 RPM with a mechanical stirrer at 90° C. for 10 hours using a thermostat. Then, the resulting mixture was diluted with 2-butanone to a solid content of 50 wt % and then filtered through a 0.45 μm Teflon filter to obtain a siloxane resin. The molecular weight of the resin was measured using GPC, and the result showed that the resin had a number average molecular weight of 2,701, a weight average molecular weight of 4,565 and a polydispersity index (PDI, Mw/Mn) of 1.69. Then, a resin composition for coating was prepared in the same manner as in Example 1, and was coated on a polyimide film to prepare a 10 μm coating film.

Example 6

KBM-403 (Shin-Etsu Chemical Co., Ltd.), ethylene glycol (Sigma-Aldrich Corporation) and distilled water were mixed at a ratio of 472.6 g:19 g:49 g (200 mmol:30 mmol:270 mmol), the resulting mixture was injected into a 1,000 mL double-jacket reactor, and 0.1 g of sodium hydroxide was dissolved in 1 mL of distilled water in a 10 mL vial using a magnetic stirrer. Then, an aqueous sodium hydroxide solution was added as a catalyst, and the mixture was stirred at 200 RPM with a mechanical stirrer at 90° C. for 10 hours using a thermostat. Then, the resulting mixture was diluted with 2-butanone to a solid content of 50 wt % and then filtered through a 0.45 μm Teflon filter to obtain a siloxane resin. The molecular weight of the resin was measured using GPC, and the result showed that the resin had a number average molecular weight of 2,801, a weight average molecular weight of 7,565 and a polydispersity index (PDI, Mw/Mn) of 2.70. Then, a resin composition for coating was prepared in the same manner as in Example 1, and was coated on a polyimide film to prepare a 10 μm coating film.

Example 7

KBM-403 (Shin-Etsu Chemical Co., Ltd.), TEOS (Sigma-Aldrich Corporation), ethylene glycol (Sigma-Aldrich Corporation) and distilled water were mixed at a ratio of 236 g:208 g:152 g:19 g (100 mmol:100 mmol:245 mmol:105 mmol), the resulting mixture was injected into a 1,000 mL double-jacket reactor, and 0.1 g of sodium hydroxide was dissolved in 1 mL of distilled water in a 10 mL vial using a magnetic stirrer. Then, an aqueous sodium hydroxide solution was added as a catalyst, and the mixture was stirred at 200 RPM with a mechanical stirrer at 90° C. for 8 hours using a thermostat. Then, the resulting mixture was diluted with 2-butanone to a solid content of 50 wt % and then filtered through a 0.45 μm Teflon filter to obtain a siloxane resin. The molecular weight of the resin was measured using GPC, and the result showed that the resin had a number average molecular weight of 2,949, a weight average molecular weight of 9,791 and a polydispersity index (PDI, Mw/Mn) of 3.32.

Then, a resin composition for coating was prepared in the same manner as in Example 1, and was coated on a polyimide film to prepare a 10 μm coating film.

Example 8

KBM-403 (Shin-Etsu Chemical Co., Ltd.), TEOS (Sigma-Aldrich Corporation), ethylene glycol (Sigma-Aldrich Corporation) and distilled water were mixed at a ratio of 330 g:125 g:143 g:18 g (140 mmol:60 mmol:231 mmol: 99 mmol), the resulting mixture was injected into a 1,000 mL double-jacket reactor, and 0.1 g of sodium hydroxide was dissolved in 1 mL of distilled water in a 10 mL vial using a magnetic stirrer. Then, an aqueous sodium hydroxide solution was added as a catalyst, and the mixture was stirred at 200 RPM with a mechanical stirrer at 90° C. for 10 hours using a thermostat. Then, the resulting mixture was diluted with 2-butanone to a solid content of 50 wt % and then filtered through a 0.45 μm Teflon filter to obtain a siloxane resin. The molecular weight of the resin was measured using GPC, and the result showed that the resin had a number average molecular weight of 2,030, a weight average molecular weight of 3,400 and a polydispersity index (PDI, Mw/Mn) of 1.67. Then, a resin composition for coating was prepared in the same manner as in Example 1, and was coated on a polyimide film to prepare a 10 μm coating film.

Example 9

KBM-403 (Shin-Etsu Chemical Co., Ltd.), TEOS (Sigma-Aldrich Corporation), ethylene glycol (Sigma-Aldrich Corporation) and distilled water were mixed at a ratio of 425 g:42 g:135 g:17 g (180 mmol:20 mmol:217 mmol:93 mmol), the resulting mixture was injected into a 1,000 mL double-jacket reactor, and 0.1 g of sodium hydroxide was dissolved in 1 mL of distilled water in a 10 mL vial using a magnetic stirrer. Then, an aqueous sodium hydroxide solution was added as a catalyst, and the mixture was stirred at 200 RPM with a mechanical stirrer at 90° C. for 10 hours using a thermostat. Then, the resulting mixture was diluted with 2-butanone to a solid content of 50 wt % and then filtered through a 0.45 μm Teflon filter to obtain a siloxane resin. The molecular weight of the resin was measured using GPC, and the result showed that the resin had a number average molecular weight of 1,653, a weight average molecular weight of 2,512 and a polydispersity index (PDI, Mw/Mn) of 1.52. Then, a resin composition for coating was prepared in the same manner as in Example 1, and was coated on a polyimide film to prepare a 10 μm coating film.

Example 10

KBM-403 (Shin-Etsu Chemical Co., Ltd.), TEOS (Sigma-Aldrich Corporation), ethylene glycol (Sigma-Aldrich Corporation) and distilled water were mixed at a ratio of 449 g:21 g:133 g:17 g (190 mmol:10 mmol:214 mmol:92 mmol), the resulting mixture was injected into a 1,000 mL double-jacket reactor, and 0.1 g of sodium hydroxide was dissolved in 1 mL of distilled water in a 10 mL vial using a magnetic stirrer. Then, an aqueous sodium hydroxide solution was added as a catalyst, and the mixture was stirred at 200 RPM with a mechanical stirrer at 90° C. for 6 hours using a thermostat. Then, the resulting mixture was diluted with 2-butanone to a solid content of 50 wt % and then filtered through a 0.45 μm Teflon filter to obtain a siloxane resin. The molecular weight of the resin was measured using GPC, and the result showed that the resin had a number average molecular weight of 1,610, a weight average molecular weight of 2,271 and a polydispersity index (PDI, Mw/Mn) of 1.41. Then, a resin composition for coating was prepared in the same manner as in Example 1 and was coated on a polyimide film to prepare a 10 μm coating film.

Example 11

KBM-403 (Shin-Etsu Chemical Co., Ltd.), TEOS (Sigma-Aldrich Corporation), ethylene glycol (Sigma-Aldrich Corporation) and distilled water were mixed at a ratio of 489 g:4.2 g:131 g:16 g (198 mmol:2 mmol:211 mmol:90 mmol), the resulting mixture was injected into a 1,000 mL double-jacket reactor, and 0.1 g of sodium hydroxide was dissolved in 1 mL of distilled water in a 10 mL vial using a magnetic stirrer. Then, an aqueous sodium hydroxide solution was added as a catalyst, and the mixture was stirred at 200 RPM with a mechanical stirrer at 90° C. for 6 hours using a thermostat. Then, the resulting mixture was diluted with 2-butanone to a solid content of 50 wt % and then filtered through a 0.45 μm Teflon filter to obtain a siloxane resin. The molecular weight of the resin was measured using GPC, and the result showed that the resin had a number average molecular weight of 1,610, a weight average molecular weight of 2,271 and a polydispersity index (PDI, Mw/Mn) of 1.41. Then, a resin composition for coating was prepared in the same manner as in Example 1 and was coated on a polyimide film to prepare a 10 μm coating film.

Example 12

KBM-503 (Shin-Etsu Chemical Co., Ltd.; 3-methacryloxypropyl trimethoxysilane), TEOS (Sigma-Aldrich Corporation), ethylene glycol (Sigma-Aldrich Corporation) and distilled water were mixed at a ratio of 447 g:42 g:135 g:17 g (180 mmol:20 mmol:217 mmol:93 mmol), the resulting mixture was injected into a 1,000 mL double-jacket reactor, and 0.1 g of sodium hydroxide was dissolved in 1 mL of distilled water in a 10 mL vial using a magnetic stirrer. Then, an aqueous sodium hydroxide solution was added as a catalyst, and the mixture was stirred at 200 RPM with a mechanical stirrer at 90° C. for 6 hours using a thermostat. Then, the resulting mixture was diluted with 2-butanone to a solid content of 50 wt % and then filtered through a 0.45 μm Teflon filter to obtain a siloxane resin. The molecular weight of the resin was measured using GPC, and the result showed that the resin had a number average molecular weight of 1,672, a weight average molecular weight of 2,951 and a polydispersity index (PDI, Mw/Mn) of 1.76. Then, a resin composition for coating was prepared in the same manner as in Example 1, except that IRGACURE 127 (BASF Corporation) was used instead of IRGACURE 250 (BASF Corporation), and was coated on a polyimide film to prepare a 10 μm coating film.

Example 13

A resin was obtained by polymerization in the same manner as in Example 9, except that propylene glycol (Sigma-Aldrich Corporation) was used instead of ethylene glycol (Sigma-Aldrich Corporation), and the resin was found to have a number average molecular weight of 1,072, a weight average molecular weight of 1,634 and a polydispersity index (PDI, Mw/Mn) of 1.52. A resin composition for coating was prepared in the same manner as in Example 1 and was coated on a polyimide film to prepare a 10 μm coating film.

Example 14

A resin was obtained by polymerization in the same manner as in Example 9, except that butane diol (Sigma-Aldrich Corporation) was used instead of ethylene glycol (Sigma-Aldrich Corporation), and the resin was found to have a number average molecular weight of 1,021, a weight average molecular weight of 1,419 and a polydispersity index (PDI, Mw/Mn) of 1.39. A resin composition for coating was prepared in the same manner as in Example 1 and was coated on a polyimide film to prepare a 10 μm coating film.

Example 15

A resin was obtained by polymerization in the same manner as in Example 9, except that pentane diol (Sigma-Aldrich Corporation) was used instead of ethylene glycol (Sigma-Aldrich Corporation), and the resin was found to have a number average molecular weight of 1,352, a weight average molecular weight of 1,795 and a polydispersity index (PDI, Mw/Mn) of 1.33. A resin composition for coating was prepared in the same manner as in Example 1 and was coated on a polyimide film to prepare a 10 μm coating film.

Example 16

A resin was obtained by polymerization in the same manner as in Example 9, except that hexane diol (Sigma-Aldrich Corporation) was used instead of ethylene glycol (Sigma-Aldrich Corporation), and the resin was found to have a number average molecular weight of 749, a weight average molecular weight of 1,213 and a polydispersity index (PDI, Mw/Mn) of 1.62. A resin composition for coating was prepared in the same manner as in Example 1 and was coated on a polyimide film to prepare a 10 μm coating film.

Comparative Example 1

KBM-403 (Shin-Etsu Chemical Co., Ltd.) and distilled water were mixed at a ratio of 473 g:54 g (200 mmol:300 mmol), the resulting mixture was injected into a 1,000 mL double-jacket reactor, and 0.1 g of sodium hydroxide was dissolved in 1 mL of distilled water in a 10 mL vial using a magnetic stirrer. Then, an aqueous sodium hydroxide solution was added as a catalyst, and the mixture was stirred at 200 RPM with a mechanical stirrer at 80° C. for 1 hour using a thermostat. Then, the resulting mixture was diluted with 2-butanone to a solid content of 50 wt % and then filtered through a 0.45 μm Teflon filter to obtain a siloxane resin. The molecular weight of the resin was measured using GPC and the result showed that the resin had a number average molecular weight of 1,872, a weight average molecular weight of 5,862 and a polydispersity index (PDI, Mw/Mn) of 3.13.

Then, a resin composition for coating was prepared in the same manner as in Example 1 and was coated on a polyimide film to prepare a 10 μm coating film.

Comparative Example 2

KBM-403 (Shin-Etsu Chemical Co., Ltd.), TEOS (Sigma-Aldrich Corporation) and distilled water were mixed at a ratio of 425 g:42 g:56 g (180 mmol:20 mmol:310 mmol), the resulting mixture was injected into a 1,000 mL double-jacket reactor, and 0.1 g of sodium hydroxide was dissolved in 1 mL of distilled water in a 10 mL vial using a magnetic stirrer. Then, an aqueous sodium hydroxide solution was added as a catalyst, and the mixture was stirred at 200 RPM with a mechanical stirrer at 80° C. for 1 hour using a thermostat. Then, the resulting mixture was diluted with 2-butanone to a solid content of 50 wt % and then filtered through a 0.45 μm Teflon filter to obtain a siloxane resin. The molecular weight of the resin was measured using GPC, and the result showed that the resin had a number average molecular weight of 2,003, a weight average molecular weight of 7,053 and a polydispersity index (PDI, Mw/Mn) of 3.52. Then, a resin composition for coating was prepared in the same manner as in Example 1 and was coated on a polyimide film to prepare a 10 μm coating film.

Comparative Example 3

KBM-503 (Shin-Etsu Chemical Co., Ltd.) and distilled water were mixed at a ratio of 497 g:54 g (200 mmol:300 mmol), the resulting mixture was injected into a 1,000 mL double-jacket reactor, and 0.1 g of sodium hydroxide was dissolved in 1 mL of distilled water in a 10 mL vial using a magnetic stirrer. Then, an aqueous sodium hydroxide solution was added as a catalyst, and the mixture was stirred at 200 RPM with a mechanical stirrer at 80° C. for 1 hour using a thermostat. Then, the resulting mixture was diluted with 2-butanone to a solid content of 50 wt % and then filtered through a 0.45 μm Teflon filter to obtain a siloxane resin. The molecular weight of the resin was measured using GPC, and the result showed that the resin had a number average molecular weight of 1,765, a weight average molecular weight of 2,862 and a polydispersity index (PDI, Mw/Mn) of 1.62. Then, a resin composition for coating was prepared in the same manner as in Example 11 and was coated on a polyimide film to prepare a 10 μm coating film.

Comparative Example 4

A resin was obtained by polymerization in the same manner as in Example 6, except that hydroquinone (Sigma-Aldrich Corporation) was used instead of ethylene glycol (Sigma-Aldrich Corporation), and the resin was found to have a number average molecular weight of 1,120, a weight average molecular weight of 1,503 and a polydispersity index (PDI, Mw/Mn) of 1.34. A resin composition for coating was prepared in the same manner as in Example 1 and was coated on a polyimide film to prepare a 10 μm coating film.

Comparative Example 5

A resin was obtained by polymerization in the same manner as in Example 9, except that 1,12-dodecanediol (Sigma-Aldrich Corporation) was used instead of ethylene glycol (Sigma-Aldrich Corporation), and the resin was found to have a number average molecular weight of 712, a weight average molecular weight of 893 and a polydispersity index (PDI, Mw/Mn) of 1.25. A resin composition for coating was prepared in the same manner as in Example 1 and was coated on a polyimide film to prepare a 10 μm coating film.

<Measurement Example>

The physical properties of the prepared coating films of Examples and Comparative examples were evaluated in accordance with the following methods, and the results are shown in Table 1 below.

(1) Surface hardness: pencil hardness was measured at a rate of 180 mm/min under a load of 1 kgf in accordance with ASTM D3363 using a pencil hardness tester manufactured by IMOTO (Japan).

cut into squares having a size of 50 mm×50 mm, and the transmittance and haze thereof were measured five times in accordance with ASTM D1003 using a haze meter (Model: HM-150) manufactured by MURAKAMI Co., and the average of the five values was calculated.

TABLE 1

|  | Surface hardness | Curl (mm) | Scratch resistance | Bending property (R) | Transmittance (%) | Haze (%) |
| --- | --- | --- | --- | --- | --- | --- |
| Example 1 | 4H | 0 | L2 S7** | <1.0* | 91.0 | 0.8 |
| Example 2 | 4H | 0 | L1 S5** | 1.2 | 91.0 | 0.8 |
| Example 3 | 4H | 0 | S4 | 1.2 | 91.0 | 0.8 |
| Example 4 | 4H | 0 | S4 | 1.2 | 91.0 | 0.8 |
| Example 5 | 4H | 0 | S5 | 1.4 | 91.0 | 0.8 |
| Example 6 | 4H | 0 | S4 | 1.8 | 91.0 | 0.8 |
| Example 7 | 5H | 0 | Good | 1.8 | 91.0 | 0.8 |
| Example 8 | 5H | 0 | Good | 1.4 | 91.0 | 0.8 |
| Example 9 | 5H | 0 | Good | 1.2 | 91.0 | 0.8 |
| Example 10 | 4H | 0 | Good | 1.2 | 91.0 | 0.8 |
| Example 11 | 4H | 0 | Good | 1.2 | 91.0 | 0.8 |
| Example 12 | 4H | 5 | Good | 1.8 | 91.0 | 0.8 |
| Example 13 | 4H | 0 | Good | 1.4 | 91.0 | 0.8 |
| Example 14 | 4H | 0 | Good | 1.4 | 91.0 | 0.8 |
| Example 15 | 4H | 0 | Good | 1.2 | 91.0 | 0.8 |
| Example 16 | 4H | 0 | Good | 1.2 | 91.0 | 0.8 |
| Comparative Example 1 | 4H | 20 | L2 S6** | 3.0 | 91.0 | 0.8 |
| Comparative Example 2 | 5H | 30 | Good | 3.4 | 91.0 | 0.8 |
| Comparative Example 3 | 4H | 40 | L2 S8** | 5.0 | 91.0 | 0.8 |
| Comparative Example 4 | 3H | 5 | L3 S7** | 3.0 | 90.8 | 0.9 |
| Comparative Example 5 | 2H | 0 | L10 S15** | <1.0* | 90.9 | 0.8 |

Note):
*"<1.0" means that the bending property is less than 1.0, it being impossible to measure values below 1.0 due to the limitations of measurement equipment.
**Simultaneous indication of L and S means that a long scratch (>5 mm) and a short scratch (≤5 mm) were both formed in the same trial during the scratch resistance test, and that a long scratch is formed due to poor scratch resistance, and a short scratch is also formed.

(2) Curl: when a sample was cut into a square having a size of 100 mm×100 mm and placed on a flat plane, the maximum distance from the bottom to the edge was measured.

(3) Scratch resistance: A film cut into a rectangle 20 cm×5 cm in size was fixed using an adhesive tape (3M) such that a coating surface faced upwards and whether or not a scratch was formed was observed when a rod wrapped with #0000 (LIBERON) nonwoven fabric was reciprocated on the flat plane 10 times at 45 rpm under a load of 1.5 kgf. When a scratch was formed, the case where the size of the scratch was greater than 5 mm (>5 mm) was indicated as "L", and the case where the size of the scratch was not greater than 5 mm (≤5 mm) was indicated as "S", whether or not there was a significant difference was determined, and the number of scratches was numerically indicated. The case where no scratches were formed was determined to be "good".

(4) Bending property: the final films prepared in accordance with Examples and Comparative Examples were cut into rectangles having a size of 50 mm×100 mm. Silver was deposited to about 100 nm on the upper surface of the coating layer to form a silver nano thin film, and the point at which conductivity was lost was detected when monitoring conductivity, while the radius of curvature of the final films was decreased by 0.1R from 20R using a radial mode of a bending tester (JIRBT-620-2, Juniltech), and the detected point was determined as "bending property (crack)".

(5) Transmittance and haze: The final films produced in accordance with Examples and Comparative Examples were As can be seen from Table 1, in Comparative Examples 1 and 2, in which ethylene glycol was not added, the radius of curvature was 3.0 mm or more, indicating that flexibility was remarkably deteriorated and the curl characteristics were also poor.

In addition, it can be seen from Examples 7 to 12 that additional incorporation of an alkoxysilane having a silane Q structure can improve hardness and scratch resistance. It can be seen from Examples 13 to 16 that the effect of improvement of the bending property depending on the chain length was determined using diol, having a longer chain, instead of ethylene glycol. However, the bending property of diol was found to be similar to that of ethylene glycol.

Meanwhile, as can be seen from Example 12 and Comparative Example 3, alkoxysilane, having an acrylic functional group, was found to be more greatly affected by curl characteristics and bending property depending on the addition or absence of diol, and that when the diol was not added, the curling property, which is affected by the acrylic functional group, is poorer than that of epoxy.

Also, in Comparative Example 4, the resin composition for coating was prepared using hydroquinone instead of the diol compound represented by Formula 2, having a linear structure, and it was found that the bending property of Comparative Example 4 was remarkably lowered compared to Examples 1 to 16. In Comparative Example 5, the resin composition for coating was prepared using 1,12-dodecanediol, wherein n was more than 10 in the diol compound represented by Formula 2, and the scratch resistance of Comparative Example 5 was remarkably lowered compared to Examples 1 to 16.

As can be seen from the Examples as described above, the resin composition for coating of the present disclosure has improved curl characteristics and remarkably excellent flexibility without causing deterioration in surface hardness or scratch resistance through incorporation of the dense cross-linking of silane network as well as the linear molecular chain of diol in the molecular structure thereof. In addition, the resin composition for coating can be imparted with further improved scratch resistance and hardness through addition of an alkoxysilane having a Q structure. Accordingly, the resin composition for coating of the present disclosure is suitable as a polymer film, especially a flexible display protective film.

INDUSTRIAL APPLICABILITY

The present disclosure is applicable to a transparent polymer film that is capable of being extensively utilized as a core material in the field of optical, transparent and flexible displays.

The invention claimed is:

1. A coating film comprising:
a base film; and
a coating layer laminated on at least one surface of the base film and comprising a cured product of a resin composition for coating,
wherein the coating film has a surface hardness in a direction in which the coating layer is formed, measured in accordance with ASTM D3363, of 3H or more,
wherein the resin composition for coating comprising a siloxane resin derived from a silane compound represented by the following Formula 1 and a diol compound represented by the following Formula 2, $R^1{}_n Si(OR^2)_{4-n}$ <Formula 1> wherein $R^1$ is a C1-C3 linear, branched or cyclic alkylene group substituted with epoxy or acryl, $R^2$ is a C1-C8 linear, branched or cyclic alkyl group, and n is an integer of 1 to 3, $HO(CH_2)_n OH$ <Formula 2> wherein n is an integer of 1 to 10.

2. A coating film comprising:
a base film; and
a coating layer laminated on at least one surface of the base film and comprising a cured product of a resin compoisition for coating,
wherein the coating film has a distance (curl) from an edge of the film to the bottom, of 5 mm or less, based on a coating thickness of 10 μm,
wherein the resin composition for coating comprising a siloxane resin derived from a silane compound represented by the following Formula 1 and a diol compound represented by the following Formula 2, $R^1{}_n Si(OR^2)_{4-n}$ <Formula 1> wherein $R^1$ is a C1-C3 linear, branched or cyclic alkylene group substituted with epoxy or acryl, $R^2$ is a C1-C8 linear, branched or cyclic alkyl group, and n is an integer of 1 to 3, $HO(CH_2)_n OH$ <Formula 2> wherein n is an integer of 1 to 10.

3. A coating film comprising:
a base film; and
a coating layer laminated on at least one surface of the base film and comprising a cured product of a resin composition for coating,
wherein the coating film has a radius of curvature, measured using a radial mode of a bending tester (JIRBT-620-2), of 2.0 mm or less, based on a coating thickness of 10 μm,
wherein the resin composition for coating comprising a siloxane resin derived from a silane compound represented by the following Formula 1 and a diol compound represented by the following Formula 2, $R^1{}_n Si(OR^2)_{4-n}$ <Formula 1> wherein $R^1$ is a C1-C3 linear, branched or cyclic alkylene group substituted with epoxy or acryl, $R^2$ is a C1-C8 linear, branched or cyclic alkyl group, and n is an integer of 1 to 3, $HO(CH_2)_n OH$ <Formula 2> wherein n is an integer of 1 to 10.

* * * * *